(12) United States Patent
Conard et al.

(10) Patent No.: US 7,745,754 B2
(45) Date of Patent: Jun. 29, 2010

(54) APPARATUS, METHOD AND PROGRAM PRODUCT FOR PROCESSING MAIL OR DOCUMENTS USING A MAIL OR DOCUMENT PROCESSING DEVICE

(75) Inventors: Walter S. Conard, Lake Villa, IL (US); Steven J. Krejcik, Brookfield, IL (US)

(73) Assignee: Bowe Bell + Howell Company, Wheeling, IL (US)

( * ) Notice: Subject to any disclaimer, the term of this patent is extended or adjusted under 35 U.S.C. 154(b) by 1002 days.

(21) Appl. No.: 11/081,847

(22) Filed: Mar. 17, 2005

(65) Prior Publication Data

US 2005/0216118 A1 Sep. 29, 2005

Related U.S. Application Data

(60) Provisional application No. 60/553,604, filed on Mar. 17, 2004.

(51) Int. Cl.
*G06K 9/00* (2006.01)
(52) U.S. Cl. .............. 209/584; 209/547; 209/551; 209/552
(58) Field of Classification Search ........... 209/551, 209/552, 547, 592, 584
See application file for complete search history.

(56) References Cited

U.S. PATENT DOCUMENTS

| | | | |
|---|---|---|---|
| 3,452,509 A * | 7/1969 | Werner | .......... 53/52 |
| 3,968,350 A | 7/1976 | Watson | |
| 4,034,669 A | 7/1977 | Freeman | |
| 4,239,434 A | 12/1980 | Gannon | |
| 4,756,520 A | 7/1988 | Clark, Jr. et al. | |
| 4,832,204 A | 5/1989 | Handy et al. | |
| 4,868,757 A | 9/1989 | Gil | |
| 4,910,686 A | 3/1990 | Chang et al. | |
| 4,923,022 A | 5/1990 | Hsieh | |
| 5,229,932 A | 7/1993 | Connell et al. | |
| 5,245,545 A | 9/1993 | Taylor | |
| 5,257,196 A | 10/1993 | Sansone | |
| 5,262,597 A * | 11/1993 | Johnson, Jr. | .......... 177/50 |
| 5,420,403 A * | 5/1995 | Allum et al. | .......... 235/375 |

(Continued)

FOREIGN PATENT DOCUMENTS

DE 100 37 756 C1 11/2001

(Continued)

OTHER PUBLICATIONS

European Office Action issued in European Patent Application No. EP 05 005 900.5-2307 dated Jul. 15, 2009.

*Primary Examiner*—Patrick H Mackey
*Assistant Examiner*—Terrell H Matthews
(74) *Attorney, Agent, or Firm*—McDermott Will & Emery LLP

(57) ABSTRACT

Disclosed is a method for processing a stream of mail pieces from different sources. The steps include detecting information corresponding to the first source from at least a first mail piece of the stream, detecting information corresponding to the second source from at least a second mail piece of the stream, counting a number of mail pieces for each of the first source and the second source, and generating a report detailing a count of mail pieces for each of the first source and the second source.

16 Claims, 11 Drawing Sheets

U.S. PATENT DOCUMENTS

| | | | |
|---|---|---|---|
| 5,673,193 A | 9/1997 | Brust et al. | |
| 5,842,186 A | 11/1998 | Kulik | |
| 6,098,057 A | 8/2000 | Dlugos | |
| 6,303,889 B1 | 10/2001 | Hayduchok et al. | |
| 6,501,041 B1 * | 12/2002 | Burns et al. | 209/584 |
| 6,510,992 B2 | 1/2003 | Wells et al. | |
| 6,539,098 B1 | 3/2003 | Baker et al. | |
| 6,697,500 B2 * | 2/2004 | Woolston et al. | 382/101 |
| 2003/0014376 A1 * | 1/2003 | DeWitt et al. | 705/406 |
| 2003/0115160 A1 | 6/2003 | Nowlin et al. | |

FOREIGN PATENT DOCUMENTS

| | | |
|---|---|---|
| DE | 101 50 464 A1 | 4/2003 |
| DE | 10150464 | 4/2003 |
| EP | 1 086 754 A2 | 3/2001 |
| WO | WO 2004/020115 | 3/2004 |
| WO | WO 2004/020115 A1 | 3/2004 |
| WO | WO 2004/029754 | 4/2004 |
| WO | WO 2004/029754 A1 | 4/2004 |
| WO | WO 2005/014189 | 2/2005 |
| WO | WO 2005/014189 A1 | 2/2005 |

* cited by examiner

APPARATUS, METHOD AND PROGRAM PRODUCT FOR PROCESSING MAIL OR DOCUMENTS USING A MAIL OR DOCUMENT PROCESSING DEVICE

CROSS-REFERENCE TO PROVISIONAL APPLICATION

This application claims the benefit of U.S. Provisional Application No. 60/553,604 entitled "Apparatus, Method and Program Product for Sorting Partially Presorted or Unsorted Input Mail" filed on Mar. 17, 2004, the disclosure of which is entirely incorporated herein by reference.

FIELD OF THE INVENTION

The present subject matter relates to a method, apparatus and program product capable of continuously processing multiple mail pieces from different sources.

BACKGROUND

Mail sorting and handling systems are commonly used in government postal facilities and by private or corporate mail handling facilities. Often, private or corporate customers receive reduced rates from the United States Postal Service (USPS) by sorting outgoing mail before sending it to the USPS. Sorters are well known in the art, and are described further herein.

FIGS. 1A and 1B illustrate two typical prior art single and multi-tier mail handling and sorting systems 100A and 100B. The single tier handling system 100A typically comprises a front end 3 and stacker or bin section 5 comprised of a plurality of bins 10. The front end 3 accepts mail or mail pieces to be sorted and conveyed to the stacker or bin section 5 where the mail pieces are selectively directed or guided to an appropriate bin 10. The front end 3 can be comprised of a series of conveying sections 2 which use motorized rollers, transport belts and idlers to convey or transport mail pieces from the front end 3 to the stacker or bin section 5. The number of conveying sections 2 in a system can vary depending on the specific application and use of a particular mail handling facility.

The system 100A shown in FIG. 1A depicts a single tier double sided stacker section 5. The single tier double sided stacker section 5 has a standard configuration that comprises a left 13 and a right side 15. Each side 13 and 15 typically comprises a plurality of bins or pockets 10 that are operatively situated adjacent to each other. The particular bins or pockets 10 each have associated transport mechanisms 17 and 19 that will appropriately operate to selectively guide a mail piece into the appropriate bin or pocket 10 upon receipt of an appropriate computer 7 command. The series of transport mechanisms 17 and 19 can include motorized rollers, compliant rollers, transport belts and associated idlers and other components. The series of transport mechanism belts form a mail path guide channel 21 where the mail pieces will travel until they are diverted into an appropriate bin or pocket 10. The mail pieces can be diverted either left to a bin 10 on the left side 13 or diverted right to a bin 10 on the right side 15.

Another type of mail handling system 100B, shown in FIG. 1B, uses a multi-tier single sided stacker section 30 with turnaround and further includes a front end 3 and a transition or elevator section 25. The transition section 25 takes the mail pieces received from the front end 3 and feeds them to the appropriate level or tier of the multi-tier single sided stacker section 30 where the mail pieces are selectively diverted to an appropriate bin or pocket 10. The mail handling system 100B shown has a configuration that comprises a rear side 32 and front side 34 operatively connected by a turnaround section 36. The rear side 32 and front side 34 typically comprise a plurality of bins or pockets 10 that are operatively connected to each other by the turnaround section 36. The bins or pockets 10 are similar to those described above and also have associated transport mechanisms that will appropriately operate to selectively guide a mail piece into the appropriate bin or pocket 10. The transport mechanisms include motorized rollers, transport belts and associated cooperative idlers. The series of transport mechanisms on each bin 10 operate in conjunction with a system transport belt and roller mechanism that are operatively situated between the front side 34 and the rear side 32 to form a double mail path guide channel where the mail pieces will travel until they are diverted into an appropriate bin or pocket 10. Unlike the double sided system 100A of FIG. 1A, the single sided system with turnaround 30 has a separate turnaround section 36, and the mail pieces can be diverted only to one side. As the mail pieces travel down the front side 34 of the multi-tier single sided stacker section 30, they can be diverted to a bin on the front side 34. In order for the mail pieces to be diverted to a bin or pocket 10 in the rear side 32, the mail pieces must completely traverse the front side 34 and traverse the turnaround section 36. The mail pieces then enter the rear side 32 where they can be appropriately diverted to a bin or pocket 10 on the rear side 32. Alternate configurations of sorters have a single central mail transport path located between the front 34 and rear 32 sides. Mail is diverted from the central transport to either side eliminating the need for the turnaround 36.

The processing or sorting of the mail pieces is typically controlled by a computer 7 with appropriate hardware and software applications to carryout desired automated mail processing functions. The front end 3 also generally comprises various auxiliary devices that in conjunction with the computer 7 allow the computer 7 to determine which particular bin 10 will receive a mail piece. The auxiliary devices can include optical character recognition readers, ink jet printers, scales and bar code readers among others devices.

The double and single sided systems 100A and 100B briefly discussed can be expanded to increase mail handling capacity. Increasing mail handling capacity of existing mail handling systems is known to be done in a couple of ways. First, existing bin sections can be replaced with new larger sorting bins having the desired or necessary mail handling capacity. Second, the mail handling capacity of the mail handling system 100A and 100B can be increased by the addition of stacker or bin sections 5 and 30 in an outward direction only. Generally, the second expansion approach is preferable to the first and is typically less expensive.

Notwithstanding these improvements, throughput of systems 100A and 100B is limited because input mail batches must be presorted. FIG. 2 illustrates conceptually a plurality of mail batches 202, 204, 206, 208 applied to the front end 210 of document process machine 200. Each of the plurality of mail batches 202, 204, 206, 208 are processed (e.g., sorted) by customer (e.g. mailer or client), mail characteristics (e.g. mail dimensions, weight, etc) and postage type (i.e., by stamp, permit and metered postage) and postage affixed (amount of postage paid).

A reader 212, such as an optical character recognition readers and bar code readers mentioned above, detects the destination information of each mail piece as it is conveyed from the front end 210 from the plurality of batches 202, 204, 206, 208. The computer 214 then directs each mail piece to the appropriate bin 216 based the destination information detected by reader 212 as processed by computer 214. Once sorting has been completed for a job, mailing instructions or a mailing report with POSTAL AUTHORITY documentation is generated by the computer 214 typically by a count of the number of mail pieces by client for each weight or weight range and postage type and postage amount affixed.

Even with the high capacity improvements mentioned above, input mail must be pre-sorted in mail batches by weight or some other common aspect of the mail pieces including, but not limited to, postage type and postage amount affixed and customer. This presorting is required because USPS or other postal authority requires that the mailing report define how many pieces of mail are being presented for mailing by weight, client, type of postage type and postage amount affixed and by either three or five digit zipcode. As well, the POSTAL AUTHORITY may require, or the need may arise and require, the mailing report be further broken down by postage type and postage amount affixed and/or customer.

The computer 214 also must track and report the same data by client so that postage billing can be made to the correct customer. As a result, processing time is increased as a result of the time it takes to presort. Current sorters can only achieve this tracking and reporting if each batch 202, 204, 206, 208 is processed as a separate run. Throughput is lost each time a new batch is setup and run on the sorter. Especially when processing multiple small batches of mail, the cumulative downtime for each setup and run can substantially degrade sorter throughput.

SUMMARY

The teachings herein alleviate one or more of the above noted problems with a method for processing a plurality of mail pieces from a first source and a second source different from the first source. The steps include (a) detecting information corresponding to the first source from at least a first mail piece of the plurality of mail pieces; (b) detecting information corresponding to the second source from at least a second mail piece of the plurality of mail pieces; (c) counting a number of mail pieces for each of the first source and the second source; and (d) generating a report detailing a count of mail pieces for each of the first source and the second source.

The teaching further entail an apparatus for processing a plurality of mail pieces and generating a mail piece count report based on at least one predefined mail piece attribute other than destination information. The apparatus includes a mail processing device for processing at least one mail batch including the plurality of mail pieces having multiple variations of the at least one predefined mail piece attribute other than destination information; a detector for detecting the at least one predefined mail piece attribute; and a computer for compiling data received from the detector, counting the number of mail pieces for each variation of the at least one predefined mail piece attribute, and generating a report detailing the count of mail pieces for each variation of the at least one predefined mail piece attribute.

The teaching even further entail a method for processing a plurality of mail pieces from a first source and a second source different from the first source. The steps include (a) receiving information detected from a mail piece corresponding to the first source; (b) receiving information detected from a mail piece corresponding to the second source; (c) generating a count of mail pieces per the first source and the second source; and (d) generating a report detailing the count of mail pieces for each the first source and the second source.

Yet further teachings entail a method for processing a plurality of mail pieces from a first source and a second source different from the first source. The steps include (a) detecting information corresponding to the first source from at least a first separator; (b) processing mail pieces that follow the first separator as corresponding to the first source; (c) detecting information corresponding to the second source from at least a second separator; (d) processing mail pieces that follow the first separator as corresponding to the second source; and (e) compiling information from each mail piece of the plurality of mail pieces, that includes the information corresponding to the first source and information corresponding to the second source, in a predetermined format.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 7C_1-7C_3 illustrate exemplary permit postage.

DESCRIPTION

Figure 1A:
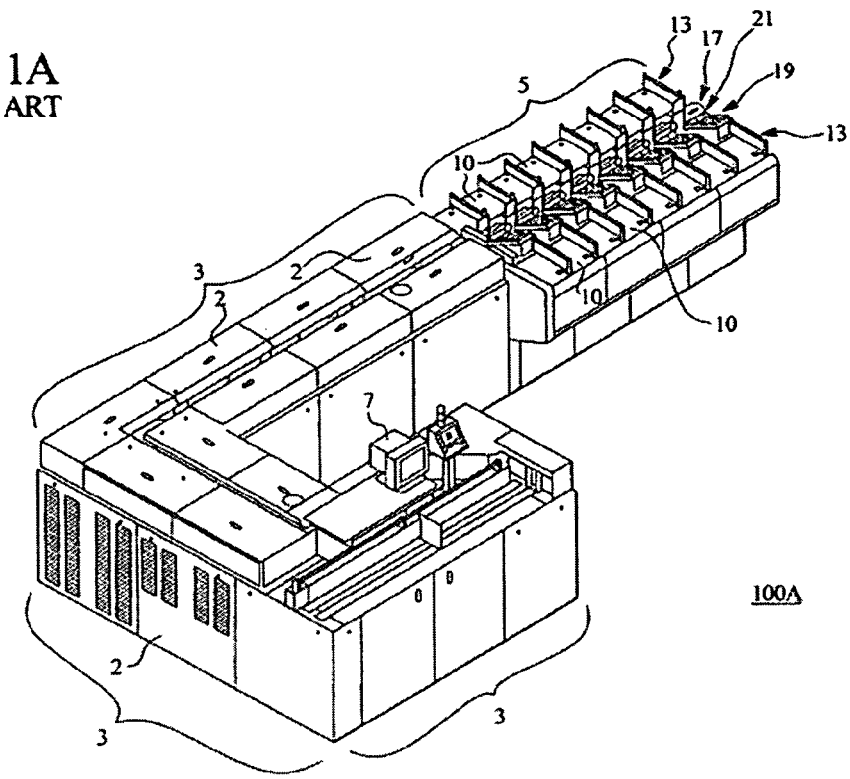
FIG. 1A illustrates a prior art single tier double sided stacker section mail handling system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and software have been described at a relatively high-level, without detail, in order to avoid unnecessarily obscuring aspects of the present teachings.

Described herein is an apparatus, method and program product that optimizes conventional software for compiling mail piece data and creating a report detailing mail piece count by, but not limited to, weight, customer of client, postage type and postage amount affixed or any combination thereof. This conventional software is used in conjunction with a mail sorter, examples of which are described herein. This conventional software could also be used in conjunction with a mail inserting device or any other mail processing device. Conventionally, mail input to a sorter must be "presorted" by weight and postage type and postage amount affixed and, if necessary, by customer. A reader on the sorter reads destination information from each mail piece as they pass through the sorter, and each mail piece is counted. The conventional software generates a report of a count of mail pieces from each batch, presorted by weight and postage type and postage amount affixed and, if necessary customer. With this implementation, throughput is degraded, as a presort is required, and the sorter must be reset to a new mail batch and restarted for each job. Without the manual presort, multiple ounce mail pieces and multiple types of postage type and postage amount affixed mail pieces cannot be run in a single batch on a sorter and still qualify for postage discounts.

Upgraded software, reader performance and sorter optimizations described herein can generate the same report even with partially presorted input mail or unsorted input mail. In order to accomplish this, the sorter must be optimized to detect information in addition to destination information for each mail piece. The reader of the conventional sorter may be replaced by a detector, which is capable of reading multiple types of information from an image taken of each mail piece and even weighing each mail piece. Reading technology for Radio Frequency Identification (RFID) tags or RFID codes imbedded in the paper can be added to read the required data directly from the code or read an unique identifier from the code that can be referenced to a database to acquire the necessary data about the mail piece. A larger RFID code can be used to directly contain descriptive data about the mailpiece, thus avoiding a database lookup. Alternately, RFID sensitive ink can be used to mark the mailpiece for identification. RFID codes can be used on separator cards that control the mail processing equipment by identifying mail batch breaks associated with client changes and mail characteristics changes. Both the paper, the ink and the detectors are available from INKODE Corporation.

The novel software package accommodates additional information collected by the detector, and for compiling this data to create a report as described above. Basically, if presorted mail or unsorted mail is applied to the input of a sorter, the detector must detect destination information of each mail piece as well as weight information printed on the mail piece, postage type and postage amount affixed, and, if necessary, customer information. This operation can be performed on commingled batches of mail, e.g., mail of multiple weights, postages affixed and customers. In other words, various types of mail are distributed through the mail batch and not segregated as required in prior art. In an alternate approach, a real time mail piece weighing system may be installed on the front of the sorter to measure actual weight. This actual weight is used by the computer to determine the correct weight category consistent with USPS or other Postal Authority regulations instead of using data detected on the mail piece by the reader/detector. The software package processes this information to generate a report of the count of mail pieces for each weight or weight class, postage type and postage amount affixed and, if necessary, for each customer.

In accordance with the foregoing, throughput time is decreased by optimizing the sorter and software package to accommodate unsorted or partially presorted input mail.

Figure 1B:
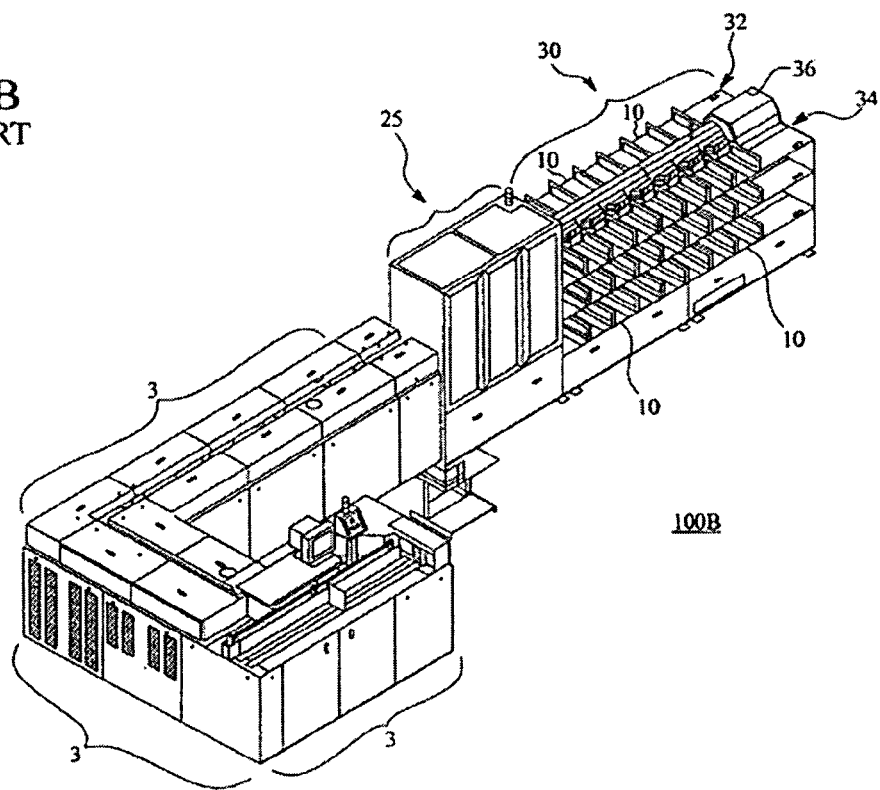
FIG. 1B illustrates a prior art multi-tier mail handling system with a single sided stacker section.
Figure 2:
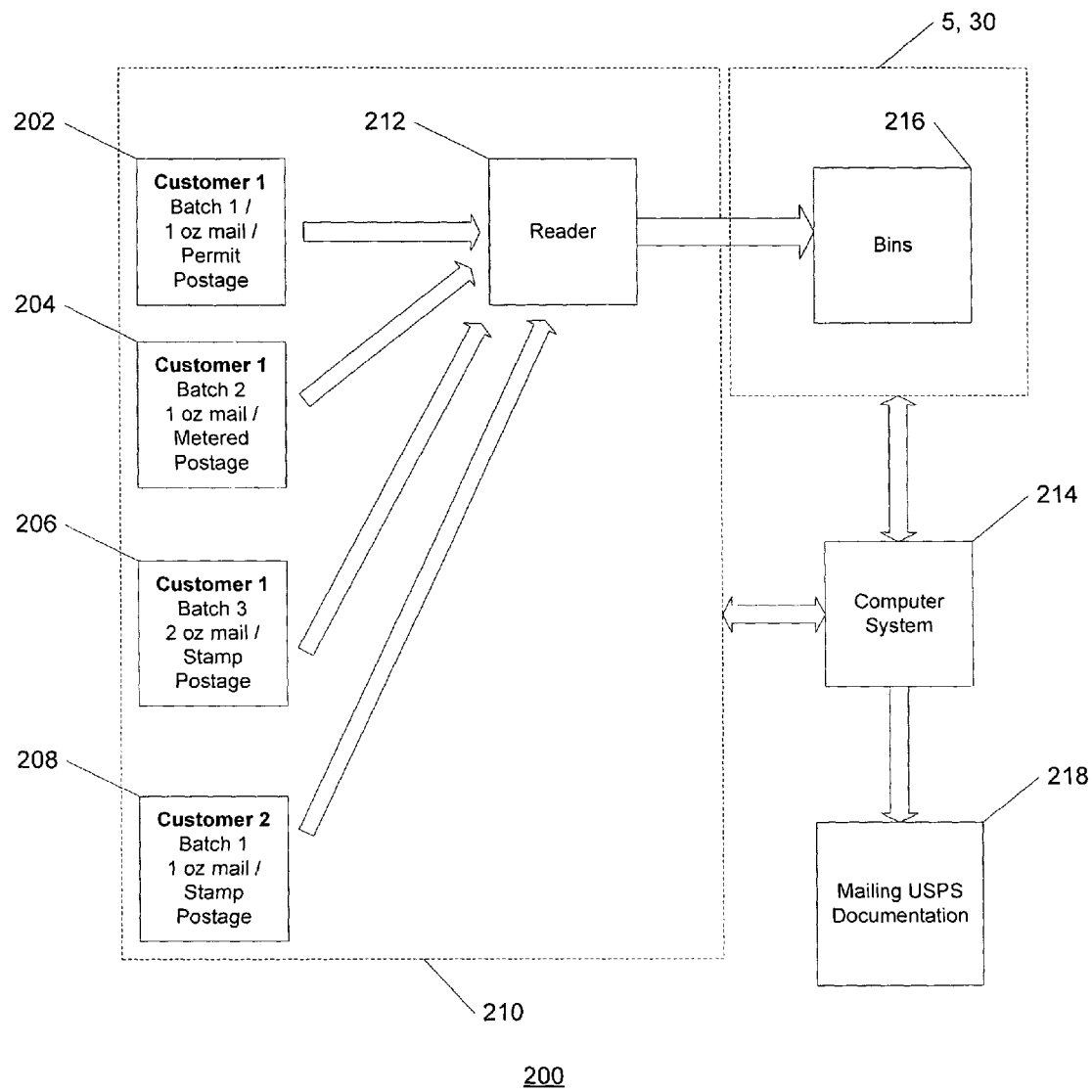
FIG. 2 illustrates a conceptual diagram of pre-sorted mail batches applied to the prior art systems.
Figure 3:
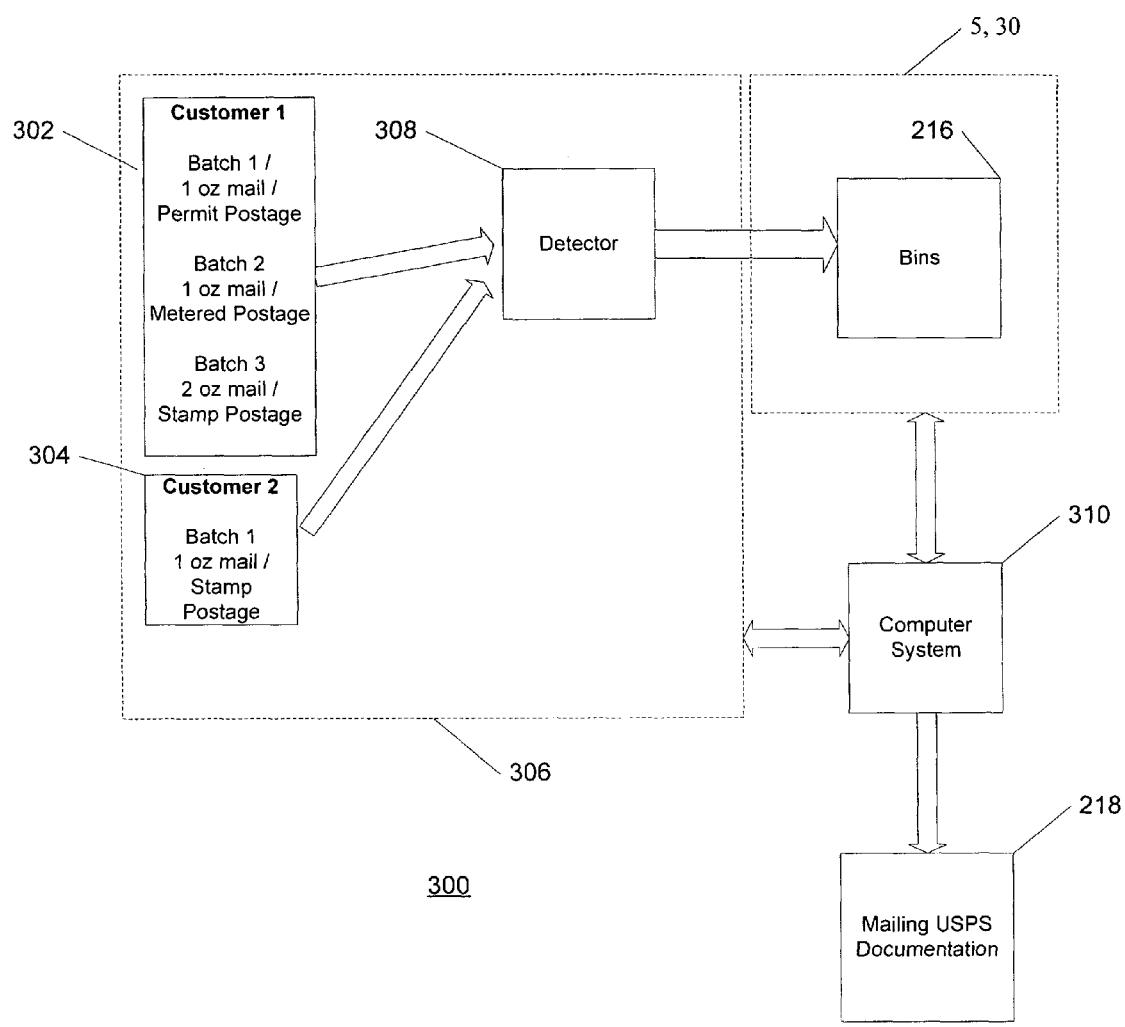
FIG. 3 illustrates an exemplary conceptual diagram of partially pre-sorted mail batches by customer applied to a sorter employing the novel concepts described herein.
Figure 4:
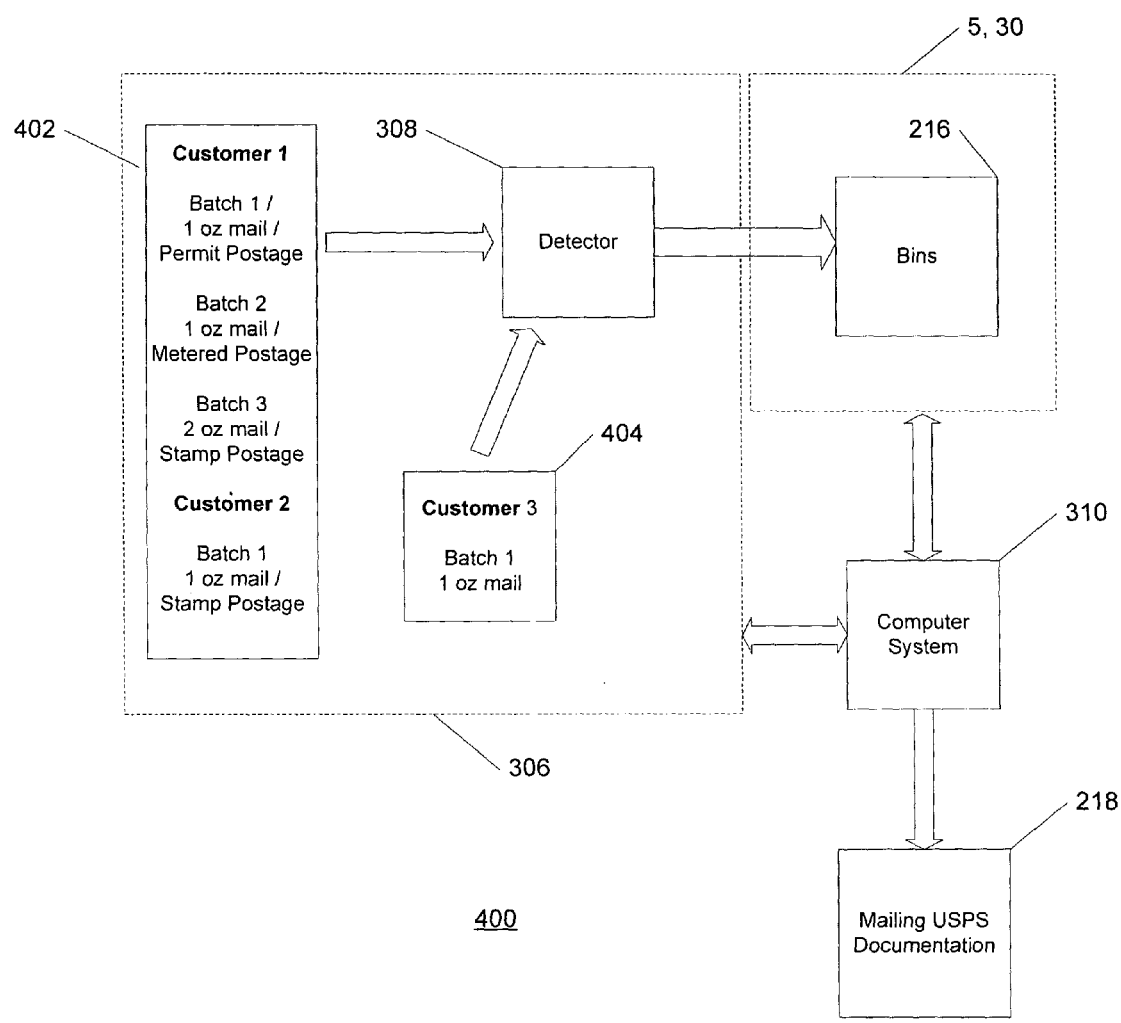
FIG. 4 illustrates another exemplary conceptual diagram of an unsorted mail batch applied to the sorter employing the novel concepts described herein.

FIGS. 3 and 4 illustrate a conceptual diagram of a sorter basically corresponding to the sorters of FIGS. 1A and 1B but upgraded with the software package described further described herein and with additional or replacement detecting equipment.

As described above, mail pieces input to conventional sorters must be presorted according to customer (mailer), weight, mail piece size, type of postage type and postage amount affixed or any combination thereof. Implementing the novel software package described herein, a sorter 300 will be capable of receiving partially presorted mail 302, e.g. a group of mail pieces that have at least one common characteristic, and sorted mail 304, as illustrated by FIG. 3. The novel software package may further process unsorted input mail. FIG. 4 illustrates the same sorter of FIG. 3 but with unsorted input mail 402 and sorted input mail 404. Unsorted mail 402 includes any grouping of mail pieces.

In the embodiments described herein, the sorter 300 is able to process mail batches from different sources or a mail batch containing mail pieces from different sources without any downtime. As shown in exemplary FIGS. 3 and 4, this is accomplished by providing a detector 308 that detects information printed on each mail piece representing individual mail piece properties in addition to the destination information. The source information may be encoded in a barcode, represented by alpha numeric data or symbols, or contained in a database (not shown) and referenced further to information detected on the mail piece. These properties may include, mail piece weight, mail piece size or format, client or customer of client, type of postage type and postage amount affixed and any other information relevant to the mail piece itself, mailer or recipient. In addition, detector 308 may be used to weigh a mail piece in-line, i.e., while the mail piece is conveyed. This is especially useful when the weight of a mail piece has not been indicated on the mail piece itself, which is often the case for permit or stamped mail. In addition, the detector 308 may be a RFID detector to read a code imbedded in the paper or encoded in the RFID sensitive ink. The RFID data may contain the necessary data or maybe a unique code for the mailpiece in question. The unique code would be used to reference and database on the computer system 310 to retrieve the necessary data.

Exemplary description of a detector 308 as described above can be found in U.S. Pat. Nos. 4,756,520, 6,510,992, and 6,697,500 and U.S. patent application Ser. No. 10/151,708, filed May 17, 2002, entitled IN-LINE MAIL WEIGHING SYSTEM AND SCALE, each of which are incorporated herein by reference.

Figure 5:
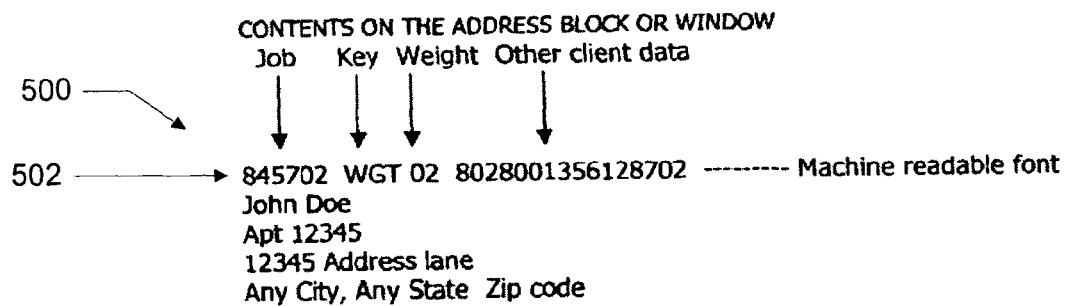
FIG. 5 illustrates exemplary key line notation.

FIG. 5 illustrates an exemplary address 500 including encoded information on the key line 502 in a machine readable font. For purposes of USPS regulations, this location must be consistent with USPS address block hygiene however. An exemplary address block is displayed with the key word WGT, representing the weight of the mail piece. Other keywords and address block layouts may also be used. The key line 502 further identifies the job number and other client data. Other client data may include information identifying the source of the mail piece (i.e., the client or customer of client), the contents of the mail piece, special handling instructions, mail piece destination information, etc.

Figure 6:
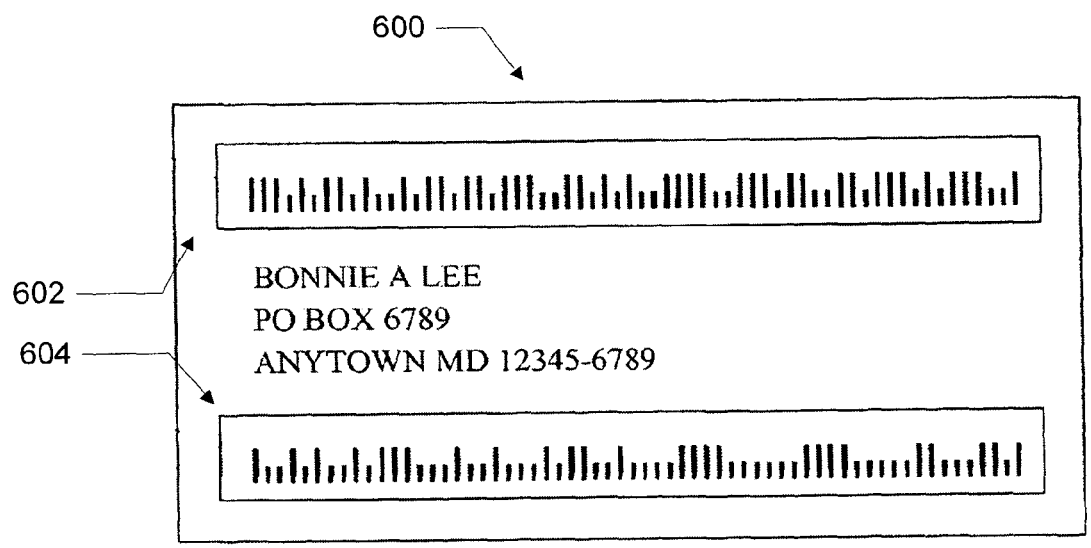
FIG. 6 illustrates exemplary PLANET and POSTNET USPS codes.

FIG. 6 illustrates an exemplary PLANET and POSTNET codes established by the Postal Service. Reference numeral 600 generally designates the address block of a conventional mail piece. Such an address block can either be printed on the outside of an envelope or on a mail piece inserted in an envelope such that address block 600 is visible through a window in the envelope. PLANET code 602 is a bar code in which bars of varying height are used to encode any suitable information, such as a service type, a customer ID or mailing and subscriber ID and a checksum. The POSTNET code 604, like the PLANET code, uses a height modulated symbology. The POSTNET code encodes destination information, such as the postal delivery code. The POSTNET code is used in combination with the PLANET code in the above-described origin and destination CONFIRM operations. Although the PLANET code 602 is located above the address information and POSTNET code 204 is located below the address information, the positioning of the codes is not limited to these locations. For example, in an alternative configuration, POSTNET code 604 can be located above the address information and PLANET code 602 can be located below the address information.

Figure 7A:
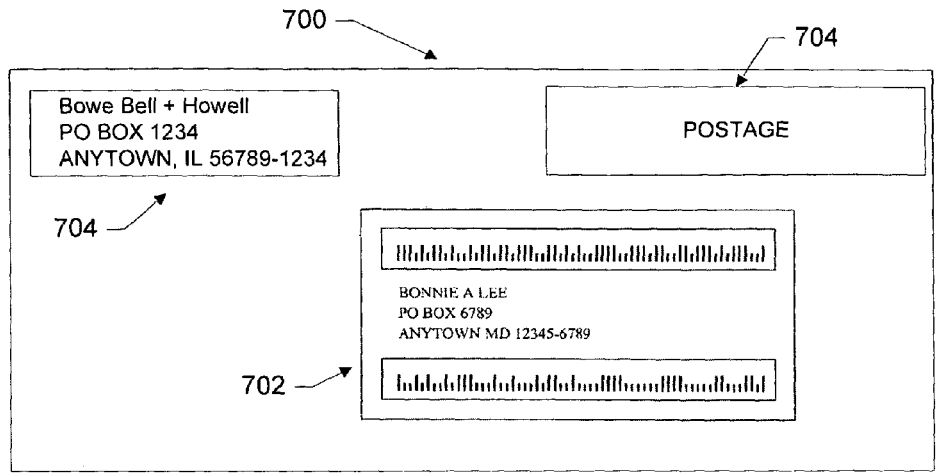
FIG. 7A illustrates an exemplary addressed envelope.

FIG. 7A illustrates an exemplary addressed envelope 700 including an exemplary address block 702 such as that illustrated by FIG. 6, an exemplary return address block 704, and postage 706. The return address 704 includes customer or client of customer information and may be printed in a machine readable font. If the return address 704 is provided in a format other than a machine readable font, character recognition software may be employed to determine the return address. While the return address includes information related to the source of the mail piece, this information may be repeated in the keyline or PLANET code also on the envelope.

Figure 7B:
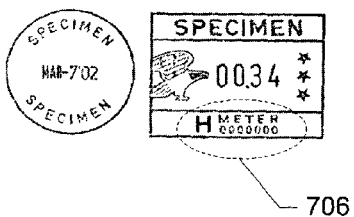
FIG. 7B illustrates exemplary meter postage.
Figure 7D:
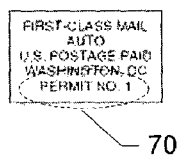
FIG. 7D illustrates exemplary digital meter postage.
Figure 7D:
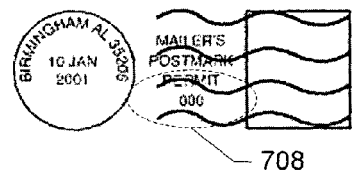
Figure 7D:
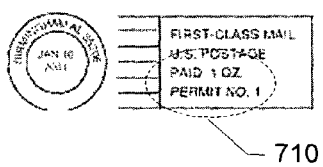
Figure 7D:
Figure 7E:
FIG. 7E illustrates exemplary pre-cancelled stamp postage.
Figure 7F:
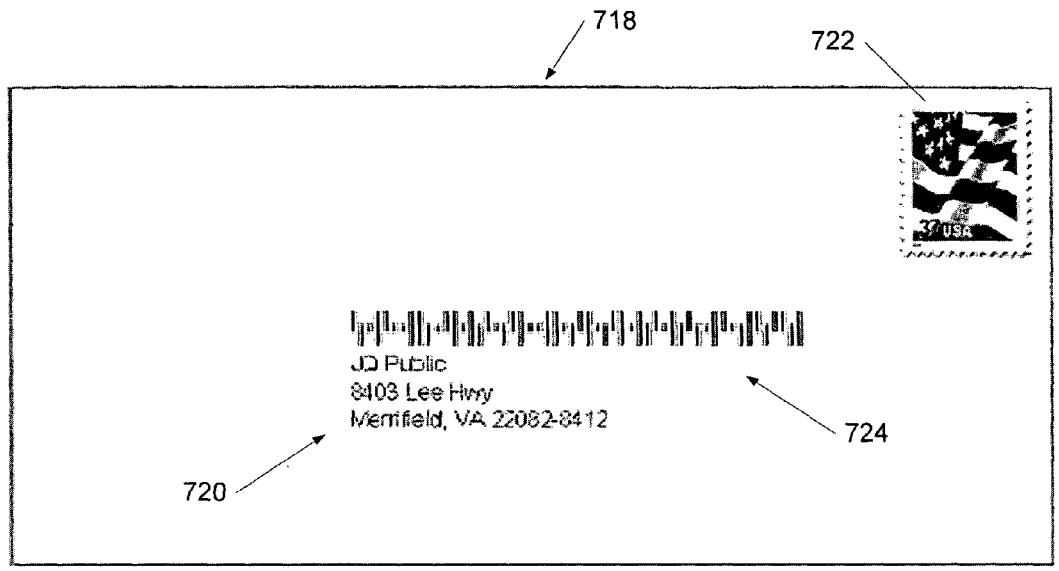
FIG. 7F illustrates 4-state customer barcode.

FIG. 7F illustrates an exemplary addressed envelope 718 including an exemplary address block 720 and postage 722 such as that illustrated by FIG. 7A. A 4-State barcode 724 is illustrated that is used by numerous postal authorities. This barcode maybe located in a variety of locations on the envelope. The code may contain the data needed to practice the new technology, uniquely identify the mailpiece so that the necessary data maybe retrieved from a database, or contain data identifying the various attributes described herein.

Figure 7G:
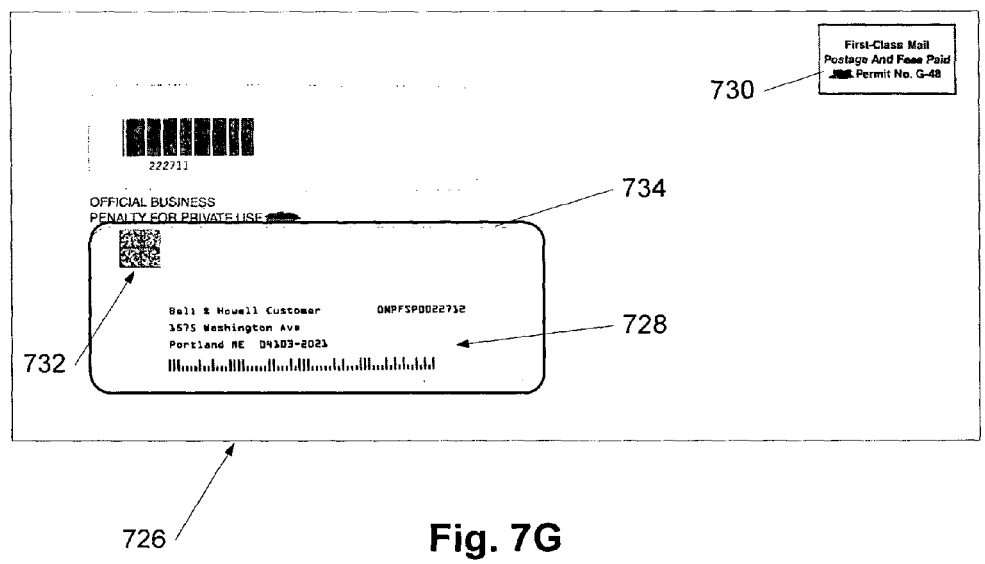
FIG. 7G illustrates data matrix barcode used for letter manufacturing control.

FIG. 7G illustrates an exemplary addressed envelope 726 including an exemplary address block 728 and postage 730 such as that illustrated by FIG. 7A. A unique barcode 732 is visible through the window 734 in the envelope. This code is used in mail manufacturing and may appear in numerous forms; a 2-D data matrix is shown. The code uniquely identifies the mailpiece and can be used to access data provided from the manufacturer in data file that is stored in the computer 310. The data file contains the data needed to identify the necessary data to sort the mail and build the compliant postal authority reports.

FIGS. 7B, 7C_1-C_3, 7D and 7E illustrate exemplary postage that may be utilized as postage 706. FIG. 7B illustrates exemplary metered postage including a meter number 706. FIGS. 7C_1-7C_3 illustrate various types of permit postage. Postage illustrated by FIGS. 7C_1 and 7C_2 include permit number 708. Postage illustrated by FIG. 7C_3 further illustrates a permit number and weight information 710. FIG. 7D illustrates exemplary digital metered imprint postage including a barcode 716, source information 712 and the meter identification number 714. FIG. 7E illustrates pre-cancelled stamp postage also used on business mail.

Adverting back to FIG. 3 or 4, detector is capable of detecting source information from input mail pieces 302, 304, 402, 404 from keyline 502 (FIG. 5), PLANET code 602 (FIG. 6), return address 704 (FIG. 7A), meter number 706 (FIG. 7B), permit number 708, 710 (FIGS. 7C_1-7C_3) and source information 712 (FIG. 7D). Alternately the permit indicia may contain the company name of the mailer (client) instead of a permit number. The detector also maybe able to read RFID tags and RFID data imbedded in the paper or ink. A table or database (not shown) maintained by the computer system 310 may be accessed to determine the client or customer of client for source information detected.

Figure 8:
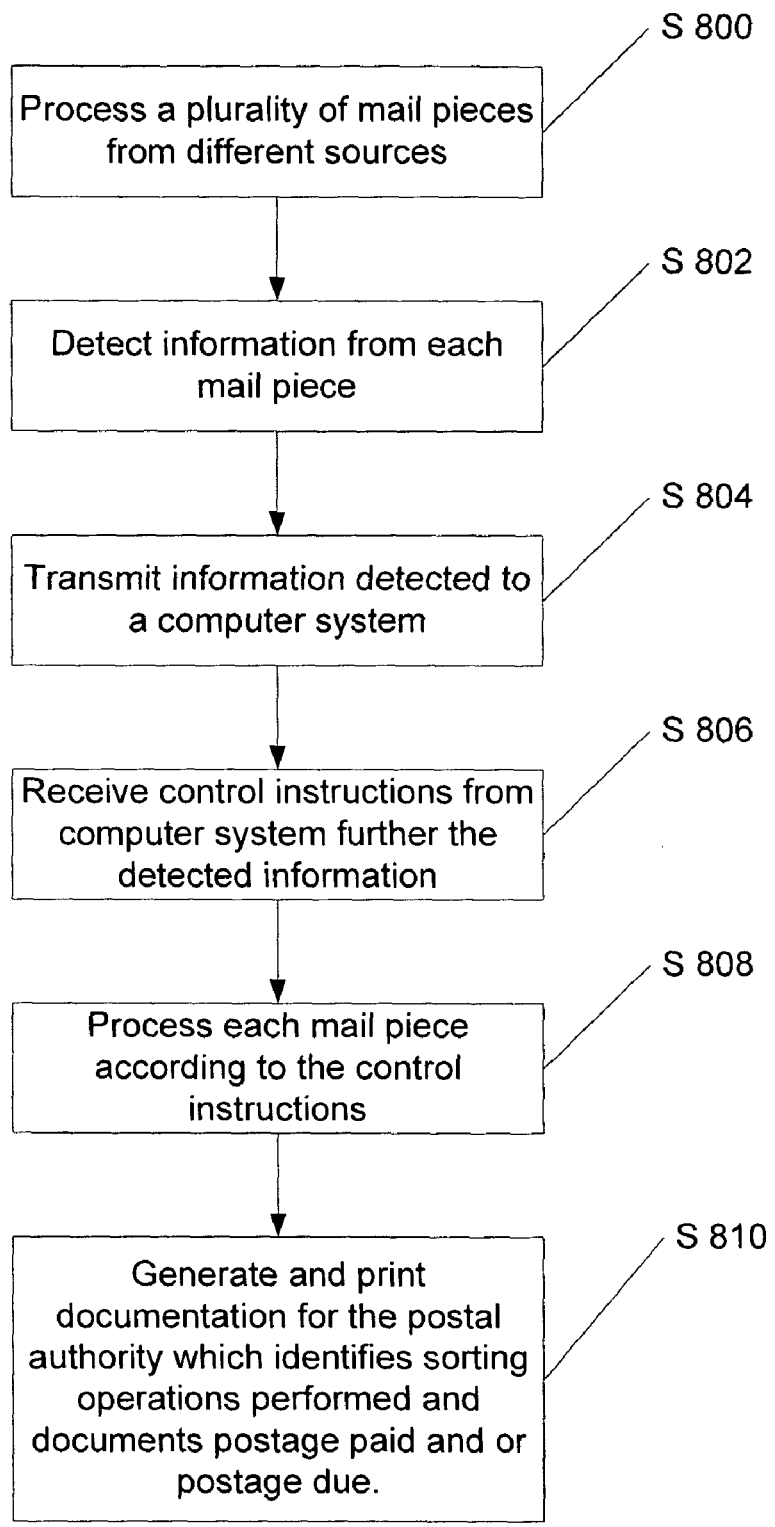
FIG. 8 illustrates a flow chart for controlling the operation of document processing device utilizing a detector and computer system.

FIG. 8 is a flow diagram of the operation of an exemplary document processing device, such as a sorter described herein. The term "Step" is abbreviated by the letter "S." In S 800, the document processing device processes a plurality of mail pieces from different sources, such as that illustrated by FIGS. 3 and 4. In S 802, the document processing device detects information from each mail piece. Detector 308 (FIGS. 3 & 4) may be utilized to detect information from each mail piece. In S 804, the information detected is transmitted to the computer system 310 (FIGS. 3 & 4), and in S 806, it returns control instructions for processing each mail piece (S 808). In S 810, documentation for the postal authority that identifies sorting operations performed and documents postage paid and/or postage due is generated. Because the processing device detects information from each mail piece, generation of the postal authority is a seamless and continuous process, even when processing mail batches from different sources.

Figure 9:
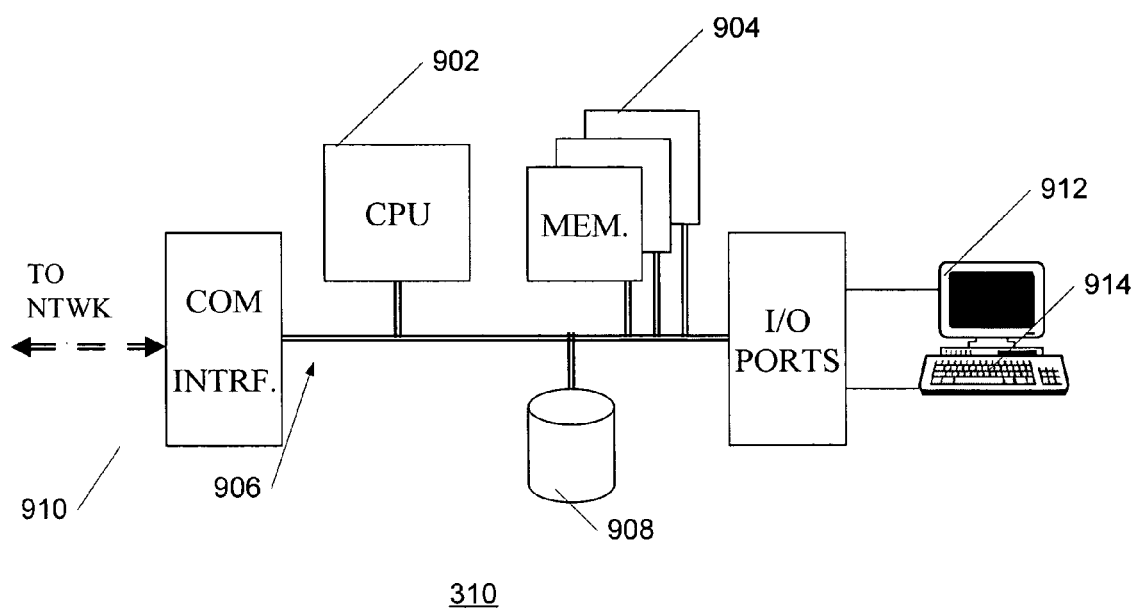
FIG. 9 illustrates a general computer used in conjunction with the document process systems described herein.

Commonly illustrated throughout, computer (CPU) 310 controls the processing and sorting of mail pieces, and is further configured to output Mailing USPS or postal authority Documentation 218, which represents the count of mail pieces by weight and postage type and postage amount affixed and, if necessary, customer or any combination thereof. Generally, computer 310 a PC or workstation type general purpose computer, which may be used as described herein. FIG. 9 is a functional block diagram of such a computer.

The exemplary computer system 310 contains a central processing unit (CPU) 902, memories 904, and an interconnect bus 906. The CPU 902 may contain a single microprocessor, or may contain a plurality of microprocessors for configuring the computer system 310 as a multi-processor system. The memories 904 include a main memory, a read only memory, and mass storage devices such as various disk drives, tape drives, etc. The main memory typically includes dynamic random access memory (DRAM) and high-speed cache memory. In operation, the main memory stores at least portions of instructions and data for execution by the CPU 58.

The mass storage 908 may include one or more magnetic disk or tape drives or optical disk drives, for storing data and instructions for use by CPU 902. For a workstation PC, for example, at least one mass storage system 908 in the form of a disk drive or tape drive, stores the operating system and application software as well as a data file. The mass storage 908 within the computer system 310 may also include one or more drives for various portable media, such as a floppy disk, a compact disc read only memory (CD-ROM or DVD-ROM), or an integrated circuit non-volatile memory adapter (i.e. PC-MCIA adapter) to input and output data and code to and from the computer system 310.

The system 310 also includes one or more input/output interfaces 910 for communications, shown by way of example as an interface for data communications via a network. The interface may be a modem, an Ethernet card or any other appropriate data communications device. The physical communication links may be optical, wired, or wireless. If used for mail sorting, the communications enable the system 310 to send Mailer USPS or other postal authority Documentation 218 to a printer (not shown) or another appropriate output device. The network or discrete interface may further connect to various electrical components of the sorters described herein to transmit instructions and receive information for control thereof. The network or discrete interface also will connect to the detector to receive data associated with mail piece characteristics. The network shall include any type of communication implementation for receiving and transmitting information to and from components of the sorter and components external to the sorter.

The computer system 310 may further include appropriate input/output ports for interconnection with a display 912 and a keyboard 914 serving as the respective user interface. For example, the computer system 310 may include a graphics subsystem to drive the output display. The output display may include a cathode ray tube (CRT) display or liquid crystal display (LCD). Although not shown, the PC type system typically would include a port for connection to a printer. The input control devices for such an implementation of the system would include the keyboard for inputting alphanumeric and other key information. The input control devices for the system may further include a cursor control device (not shown), such as a mouse, a trackball, stylus, or cursor direction keys. The links of the peripherals to the system may be wired connections or use wireless communications.

The computer system 310 shown and discussed is an example of a platform supporting processing and control functions of the sorters described herein. The mail sorting functions and the computer processing operations discussed herein may reside on a single computer system, or two separate systems; or one or both of these functions may be distributed across a number of computers.

The software functionalities of the computer system 310 involve programming, including executable code as well as associated stored data. Software code is executable by the general-purpose computer 310 that functions as a sorter controller. In operation, the code and possibly the associated data records are stored within the general-purpose computer platform 310. At other times, however, the software may be stored at other locations and/or transported for loading into the appropriate general-purpose computer system. Hence, the embodiments involve one or more software products in the form of one or more modules of code carried by at least one machine-readable. Execution of such code by a processor of the computer platform enables the platform to implement the catalog and/or software downloading functions, in essentially the manner performed in the embodiments discussed and illustrated herein.

As used herein, terms such as computer or machine "readable medium" refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s) operating as one of the server platform, discussed above. Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 10:
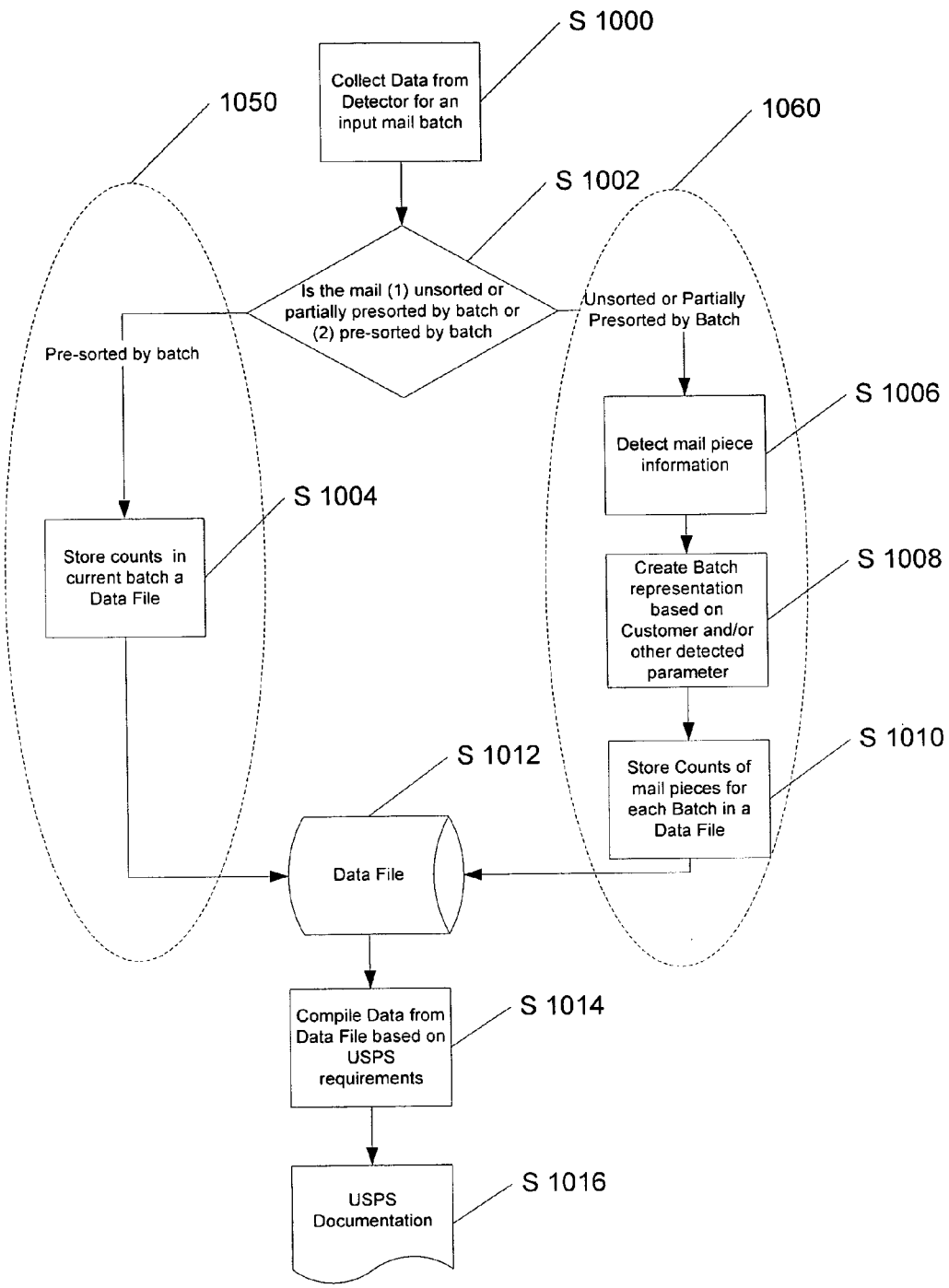
FIG. 10 illustrates a flowchart for generating postal authority documentation for presorted input mail, partially presorted input mail, unsorted input mail, or any combination thereof.

FIG. 10 illustrates a flow chart for the software package described herein for optimizing a sorter to accommodate mail input which is unsorted, partially presorted, presorted or any combination thereof. Particularly, at step S 1000, computer system 310 processes data collected from detector 308 for determining whether the mail input is (1) unsorted 402 (FIG. 4) or partially presorted 302 (FIG. 3) or (2) presorted 304, 404 (FIGS. 3 and 4). As discussed above, the computer system 310 may process other types of data representing attributes of each mail piece. If multiple weights, multiple types of postage type and postage amount affixed or multiple customers are detected, mail input may be classified as partially presorted. If multiple variations of more than one attribute (e.g., weight, postage type and postage amount affixed, customer, etc.) are detected, mail input may be classified as unsorted. If each mail piece has the same customer, weight, postage type and postage amount affixed, and any other common mail attribute, the mail input may be classified as presorted. Alternatively, this step can be accomplished by a user designating whether input mail is unsorted, partially pre-sorted or sorted.

In the event the mail input is presorted, the computer system 310 will control the sorter in the conventional manner described in the background and designated by numeral 1050. Specifically, in step S 1004, the computer system 310 will control the sorting of mail pieces in accordance with destination information detected by detector 310. Because mail input has been presorted, there is no need to process information representing mail piece attributes such as weight and customer information.

If mail input is partially presorted or unsorted, computer system 310 will control sorting and report generation for the mail pieces in accordance with information detected by detector 308, representing information in addition to destination information. These process steps including steps S 1006-S 1010 are represented by reference numeral 1060. In step S 1006, mail piece information is detected. As discussed above, detector 308 detects the mail piece information. In Step S 1008, batch designations are created based on weight (e.g., 1 oz, 2 oz, 3 oz, etc).

In step S 1010, the computer system 310 compiles a count of each mail piece for each batch. For instance, if the batches are partially presorted or unsorted, the count in S 1008 will represent the number of mail pieces for each weight and the count for each weight per customer, as detected in S 1006. Naturally, other attributes may be incorporated into the count, such as the count per job number, count per postage type and postage amount affixed, etc.

More particularly, adverting to FIG. 3, partially presorted mail 302 includes mail pieces of multiple weights and multiple types of postage type and postage amount affixed, but the same customer. As such, creating batch designations based on weight and type of postage type and postage amount affixed would be adequate. However, in the case of FIG. 4 having unsorted mail including multiple weights, multiple types of postages affixed and multiple customers, in step S 1008, batch designations would be created representing each weight class by customer and by type of postage type and postage amount affixed. In this case, in step S 1010, computer system 310 would count the number of mail pieces for each weight class by customer and postage type and postage amount affixed.

In S 1004 or S 1010 counts are stored in the data file. At this point, the information stored in the data file is the same as the information stored if mail input was presorted. In S 1014, the data from the data file is compiled in accordance with postal authority requirements, and in S 1016, documentation is generated for the postal authority which identifies sorting operations performed and documents postage paid and/or postage due.

Source information may be detected from each mail piece input to the document processing device, by detecting source information directly from the envelope. Source information can be obtained from key line 502 (FIG. 5), PLANET code 602 (FIG. 6), return address 704 (FIG. 7A), meter number 706 (FIG. 7B), permit number 708, 710 (FIGS. 7C_2-7C_3), 4-State barcode 719 (FIG. 7G), manufacturing code 717 (FIG. 7F); digital meter barcode 716, mailer code 712 (FIG. 7D). Additional identification data and technologies maybe added to a mailpiece in the future, such as RFID, which can be used to read or reference the necessary data. The detector is designed to read all of the data on the envelope and use redundant data to maximize the read accuracy. If the information detected is insufficient to determine the source of the mail piece, a database or table may be accessed and cross referenced with the detected information. For instance, a database (not shown) may contain a list of all meter numbers 706 (FIG. 7B) and associated client or customer of client needed for generating postal authority documentation. The database may be accessed upon detecting a meter number 706 for determining the correct client.

When identifying individual characteristics of a mail piece there may be pieces where the computer 310 is unable to identify the specific characteristic the detector 308 has sent or the detector 308 will be unable to detect the characteristics of the piece. This could happen if the characteristic is obliterated or damaged or not part of a predefined set of characteristics. Further optimization may resolve such cases, and is best explained by way of example. In addition, a flow chart illustrating this operation is provided at FIG. 11.

Consider a plurality of mail pieces each having a customer identifier thereon. A first mail piece is successfully identified as customer A, but a second or subsequent mail piece is not identified as a known customer, or there is a no-read. Then, a third piece is identified as customer A.

Figure 11:
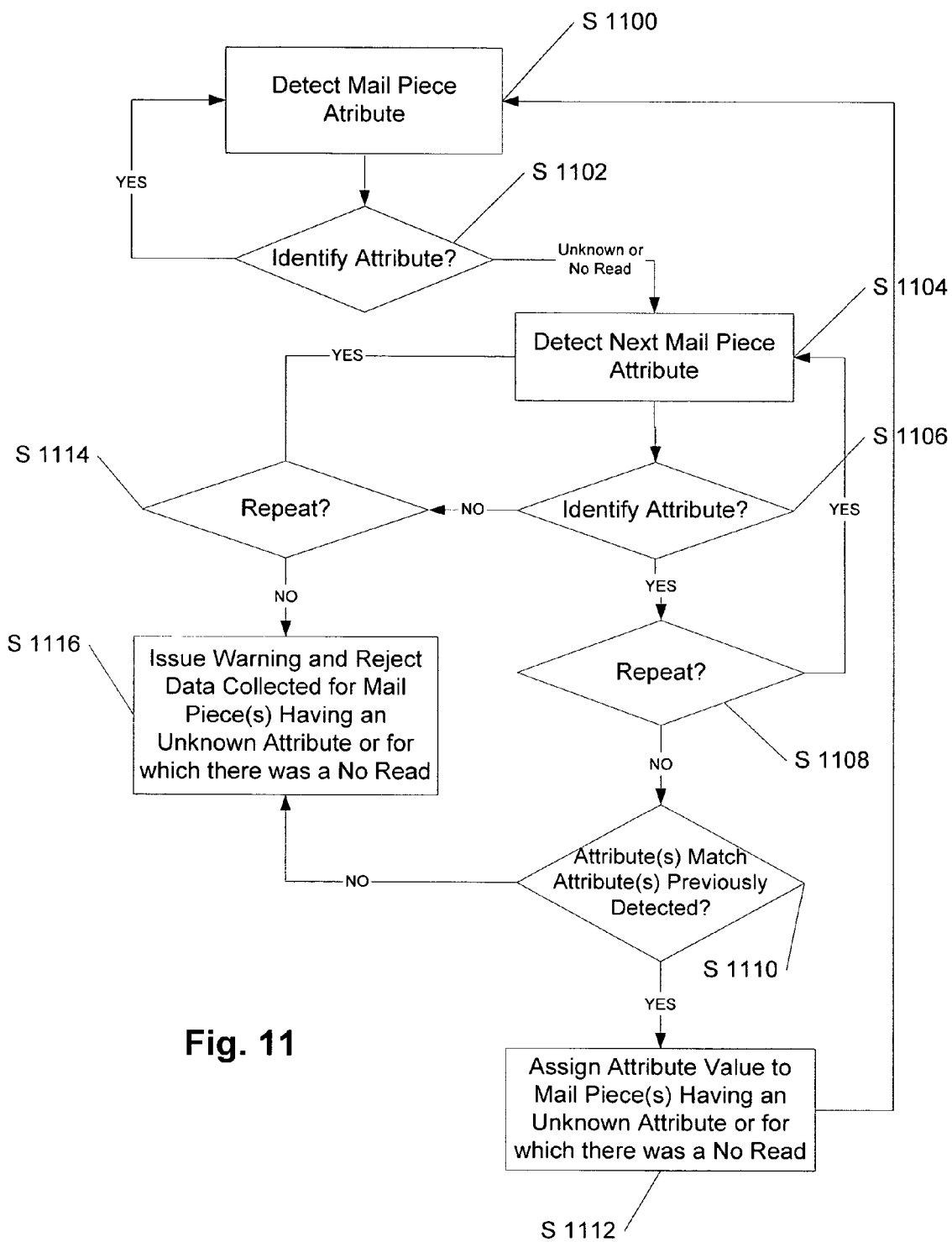
FIG. 11 illustrates a flow chart for processing a mail piece having an unknown attribute or for which there is a no read.

Referring to FIG. 11, in S 1100, a detector 308 detects an identifier on a mail piece and transmits information to the computer system 310. The computer system 310 analyses the information received to determine if a customer has been identified or if a customer has not been identified or there is no read (S 1102). If the customer has been correctly identified, the detector 308 and computer system 310 continue to process subsequent mail pieces. However, if the detector 308 detects a customer for which there is no information or the detector 308 is unable to read the attribute, if any, the detector 308 detects the next mail piece (S 1104). In this example, the next mail piece would correspond to the second mail piece. It is again determined if a customer has been identified or if a customer has not been identified or there is no read (S 1106).

Integrity may be enhanced by examining a predetermined number of mail pieces that following a mail piece having an unknown attribute or for which there was a no read. Thus, in S 1108, the process of successfully detecting customer attributes may repeat for a predetermined number of mail pieces. If no repetition is necessary or if the predetermined number of successful detections have occurred, it is determined whether the customer(s) detected following the mail piece having an unknown attribute or for which there was a no read matches the customer of the mail piece previously detected (S1100). If there is a successful match, the mail piece(s) having an unknown attribute or for which there was a no read is assigned the matching customer attribute value (S 1112).

Returning to S 1106, if unable to identify the customer of the next mail piece, the process may be repeated for yet again the next mail piece. However, integrity may be lessened as the number of consecutive mail pieces that have attributes unresolved increases. The number of consecutive mail pieces that have attributes unresolved may be set to any predetermined number. In this example, assume that the predetermined number of consecutive mail pieces having attributes unresolved is set to zero. Therefore, upon the second occurrence of a mail piece that have attributes unresolved, a warning is issued and any data collected for the mail piece(s) having an unknown attribute or for which there was a no read is rejected (S 1116).

In S 1110, if it is determined that customer does not match a customer previously detected, the system may be unable to resolve the customer for the mail pieces having an unknown attribute or for which there was a no read is rejected. In this case, a warning is issued and any data collected for the mail piece(s) having an unknown attribute or for which there was a no read is rejected (S 1116).

The repeat steps, S 1108 and/or S 1114, may be further enhanced with the following assumptions. These steps could be configured by the user to make the assumption that more than one consecutive no-read will assume the identity of the pieces before and after (i.e., repeat for S 1108 would be zero).

Alternatively, S 1110 may be further enhanced with the following assumptions. One or more no-read mail pieces assume the identity of only the piece before the no-read. Alternatively, one or more no-read mail pieces assume the identity of only the piece after the no-read.

When processing multiple batches of mail from different clients, a separator (not shown) may be placed between each mail batch in a staging area (not shown) of a document processing device. The separator may be in the form of a card or generic mail piece. In either case, the separator may contain source information for the at least one mail piece that follows and an identifier that identifies it as a separator, as opposed to a mail piece that needs to be sorted. The separator also may contain RFID coded data to enable identification as a separator card. Alternately, the separator may only identify to the system that the detector must now read the necessary data to identify the next mail batch characteristics. This process has the advantage that the detector does not have to analyze all of the parameters such as client and type of postage affixed between separator cards thus saving detector processing time. In addition, the detector can process multiple mailpieces to derive all the necessary data. However, as used herein, the separator may be generally referred to as a mail piece. Accordingly, detector 308 will detect a separator and source information thereon for the mail piece(s) that follow. Because the separator does not need to be sorted with the mail batch that follows, it may be removed by the document processing machine once it is identified to be a separator. In the case of a sorter, the separator would be sent to a reject bin. The mail batch will be processed by the document processing machine and counts for each attribute detected for each mail piece of the batch will be determined. Once the detector 308 detects the next separator, the computer system 310 will begin a new count for the mail batch that follows the separator. As a result, multiple mail batches from different sources may be continuously processed without any downtime.

Alternately, mail batches maybe queued as follows: A mail sorting process used with a sorting machine where an operator defines a list of Jobs/Profiles in the mail sorting machine's computer controller, or in a distributed computing environment, assigns a list to a sorting machine. The mail is organized such that it is physically in this same order and available at the sorting machine intake. The sorting machine has available this list of jobs or profiles in sequence. The machine operator is able to keep mail on the intake with no required breaks between Jobs/Profiles. The machine operator inserts a separator, as discussed above, between mail pieces to identify a change in job or profile. Thus, the system is able to read and identify the separator device(s) as different than a standard mail piece. The system automatically switches to the next job or profile in sequence upon reading a separator device. The sorting machine is able to continuously run mail through with no break, allowing peak efficiency requiring little or no interaction to change jobs or profiles at the sorting machine operation computer, allowing the machine operator to focus on sweeping and keeping intake full, or any other job as needed.

A queue of jobs and/or profiles is assembled in the system. An operator may assemble this list by the following: (1) Selecting Profiles from a list of all Customers and their associated Profiles as previously set up in the system. (2) Selecting Profiles from a list of all Customers that have been previously identified as having mail to be sorted at the facility on the day the list is being built. (3) Scanning a barcode that contains the Profile ID. The barcode may also include a Job Number. A Job Number may be entered manually after scanning the Profile ID. (4) Manually typing in a portion or entirety of a Customer or Profile name or ID, which the system will verify against an existing database and may auto-complete as they type from said database. (5) Any combination of these input methods.

Also, the queue of jobs and/or profiles may be set up in advance and assigned to a sorting machine, or it may be set up as the sorting machine is in operation. Mail is lined up physically according to the queue order, and is run in that order. The sorting machine will display for the machine operator the next Profile/Job in the queue such that they may verify that they are placing the correct mailpieces on the machine.

The queue may be updated as the sorting machine is in operation, allowing the machine operator to correct for a different list on the machine than they have physically ready for sorting without need to stop the machine. Thus, the order of Profiles/Jobs may be changed. New Profiles/Jobs may be inserted. Jobs/Profiles may be removed from the queue.

A generic separator device is placed between jobs at the infeed. This can be any object that will pass through the sorter and can be clearly identified as not being a mailpiece. Separator device options that have been mentioned include, but are not limited to: specially barcoded cards; cards with a character sequence readable by OCR and impossible to confuse with an address; A card with an RFID device imbedded; a metal separator that may be sensed by metal detector. Multiple separator devices may be placed in a batch to insure the machine picks up at least one device and switches profiles. In such an instance, consecutive separator devices would not cause the system to advance more than one profile. Similarly, these devices are not counted as mailpieces.

When the detector 308 detects a separator device, the system advances to the next profile in the queue and continues sorting. Manual switching can happen via mouse interaction or keyboard shortcuts. A single keypress event may be assigned to switch. Similarly, two consecutive keypress events could be used by assigning the same quick-key shortcut to the Profiles editor and to the "next Profile in Queue" key.

Finally, profiles in the queue can be re-ordered and removed. Only the currently running profile is untouchable.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
    processing a plurality of mail pieces from a first source and a second source different from the first source, on document processing equipment, and requiring substantially no interaction by an operator and no resetting of the sorter of the document processing equipment during time between processing of a final mail piece of the plurality of mail pieces of the first source and processing of an initial mailpiece of the plurality of mail pieces of the second source, the processing further including:
    receiving the plurality of mail pieces for each of the first source and the second source as an unsorted or only partially presorted stream of mail pieces;
    detecting information corresponding to the first source from at least a first mail piece of the plurality of mail pieces in the received stream of mail pieces;
    detecting information corresponding to the second source from at least a second mail piece of the plurality of mail pieces in the received stream of mail pieces;
    responsive to the detecting steps, counting a number of mail pieces for each of the first source and the second source; and
    generating a report detailing the counted mail pieces, for each of the first source and the second source, wherein the first source is a first mail batch from a first customer, and the second source is a mail batch from a second customer or a second mail batch from the first customer.

2. The method according to claim 1, wherein the plurality of mail pieces comprises a first mail batch from the first source and a second mail batch from the second source, further comprising steps of:
    assigning the first source to the first mail batch upon detecting information corresponding to the first source from at least the first mail piece; and
    assigning the second source to the second mail batch upon detecting information corresponding to the second source from at least the second mail piece.

3. The method according to claim 1, further comprising a step of detecting source information from each mail piece of the plurality of mail pieces.

4. The method according to claim 1, further comprising a step of detecting an attribute other than information corresponding to the first source or the second source from each mail piece.

5. The method according to claim 4, wherein the attribute is selected from a group consisting of destination, mail piece weight, job number, permit number, postage amount, handling instructions and mail piece contents.

6. The method according to claim 5, further comprising a step of counting a number of mail pieces for the attribute.

7. The method according to claim 1, further comprising a step of determining source information from machine readable code or font on the respective mail piece.

8. The method according to claim 7, wherein the machine readable code or font is selected from a group consisting of a barcode, planet code, postnet code and alphanumeric characters.

9. The method according to claim 1, further comprising steps of:
    detecting an identifier on the respective mail piece; and
    cross referencing the identifier in a table to determine the respective source.

10. The method according to claim 1, further comprising steps of:
    detecting the return address of the respective mail piece; and
    employing optical character recognition software to determined the first source or the second source from the return address.

11. The method according to claim 1, further comprising steps of:
    inputting information corresponding to at least the first source and the second source;
    comparing information corresponding to the first detected source with the information from the inputting step; and
    comparing information corresponding to the second detected source with the information from the inputting step.

12. A programmable device, configured to execute the steps of claim 1.

13. A product comprising instructions for causing a programmable device to perform the steps of the method of claim 1, and a machine readable medium bearing the instructions.

14. The method for processing a plurality of mail pieces according to claim 1, wherein the steps of detecting information corresponding to the first or second source includes:
    detecting an Radio Frequency Identification ("RFID") element from an article associated with the received stream of mail pieces of the first or second source;
    determining information represented by the RFID element; and
    controlling processing of at least the first or second mail piece of the plurality of mail pieces according to the determined information.

15. The method for processing a plurality of mail pieces according to claim 14, the article corresponds to a separator or a mail piece.

16. The method for processing a plurality of mail pieces, according to claim 15, further comprising the step of generating a report detailing a count of mail pieces for the first or second source.

* * * * *